US009374278B2

(12) United States Patent
Gao et al.

(10) Patent No.: US 9,374,278 B2
(45) Date of Patent: Jun. 21, 2016

(54) GRAPHIC USER INTERFACE BASED NETWORK MANAGEMENT SYSTEM TO DEFINE AND EXECUTE TROUBLESHOOTING PROCEDURE

(71) Applicants:Lingping Gao, Burlington, MA (US); Guangdong Liao, Toronto (CA)

(72) Inventors: Lingping Gao, Burlington, MA (US); Guangdong Liao, Toronto (CA)

(73) Assignee: NETBRAIN TECHNOLOGIES, Inc, Burlington, MA (US)

( * ) Notice: Subject to any disclaimer, the term of this patent is extended or adjusted under 35 U.S.C. 154(b) by 568 days.

(21) Appl. No.: 13/841,735

(22) Filed: Mar. 15, 2013

(65) Prior Publication Data
US 2014/0282027 A1    Sep. 18, 2014

(51) Int. Cl.
*H04L 12/24* (2006.01)
*H04L 12/22* (2006.01)
*H04L 12/26* (2006.01)

(52) U.S. Cl.
CPC ............... *H04L 41/22* (2013.01); *H04L 12/22* (2013.01); *H04L 41/085* (2013.01); *H04L 41/0213* (2013.01); *H04L 41/069* (2013.01); *H04L 41/0681* (2013.01); *H04L 41/0853* (2013.01); *H04L 41/12* (2013.01); *H04L 43/045* (2013.01); *H04L 43/0811* (2013.01); *H04L 43/0817* (2013.01); *H04L 43/10* (2013.01); *H04L 43/16* (2013.01)

(58) Field of Classification Search
CPC ....... H04L 41/085; H04L 41/12; H04L 41/22; H04L 43/10; H04L 12/22
See application file for complete search history.

(56) References Cited

U.S. PATENT DOCUMENTS

| 2012/0054551 | A1* | 3/2012 | Gao | ................... | G06F 11/3664 714/38.1 |
| 2012/0259762 | A1* | 10/2012 | Tarighat | ................... | G06F 8/34 705/37 |
| 2013/0305091 | A1* | 11/2013 | Stan | ................... | G06F 11/263 714/35 |

OTHER PUBLICATIONS

NetBrain wORKSTATION 2.0 Oct. 10, 2008.*
NetBrain Technologies New Channel Strategy in North America and Europe Mar. 17, 2010.*
NetBrain Technologies Releases Enterprise Suite 4.0 at CiscoLive 2011, Jul. 8, 2011.*
NetBrain Workstation Architect Edition ,parts of chapter 10, Apr. 27, 2010.*

* cited by examiner

*Primary Examiner* — Larry Donaghue
(74) *Attorney, Agent, or Firm* — Jie Tan; JT Law Services, PC

(57) ABSTRACT

Methods and systems for automated network management are disclosed. A set of GUI-based network management components and running environment are provided. An Executable Procedure can be created and saved as an independent application, automatically executed through a running environment to any network system. Such Procedure may be used for automated trouble shooting, customized report or for generating a visual network device map.

18 Claims, 18 Drawing Sheets

GRAPHIC USER INTERFACE BASED NETWORK MANAGEMENT SYSTEM TO DEFINE AND EXECUTE TROUBLESHOOTING PROCEDURE

BACKGROUND

The present application relates to network management, and more particularly to graphic user interface based automated procedures in network management.

Note that the points discussed below may reflect the hindsight gained from the disclosed inventions, and are not necessarily admitted to be prior art.

No doubt we are living in a time that almost every one of us and every single entity is connected by devices and computers via the Internet, proprietary intra-electronic networks through cable or wireless. Data and communications are being inter-exchanged constantly through the vast and complex network connections. A single interruption in network communication could mean hundreds of thousands of dollars in losses and damages. According to some current conservative estimates, network outages could cost $1,400 per minute on average. Reducing the down time is critical to the success of business.

Like the transportation highways in the real world, the communication highways in the virtual world are becoming ever more tangled and more complicated each single minute. Management of these networks is becoming more challenging at the most basic levels. Identifying a problematic device from the vast sea of network devices is literally like finding a needle in a hay stack.

The conventional way for network troubleshooting requires a network professional to manually run a set of standard commands and processes for each of the devices. However, to become familiar with those commands, along with each of its parameters takes years of practice. Also complicated troubleshooting methodology is often hard to share and transfer. Therefore even though a similar network problem happens again and again, each instance of troubleshooting may still have to start from scratch. However, networks are getting more and more complex and it is increasingly difficult to manage it efficiently with traditional methods and tools. The following are the key challenges using conventional ways to troubleshoot network problems:

Firstly, with text-based Command-Line Interface (CLI) as the primary method for troubleshooting a network problem, a network professional usually needs to repetitively execute the same CLI commands and decode key data from the command output many times for many network devices. This process is error-prone, strenuous and time consuming.

Secondly, currently there is no efficient mechanism or method to record a troubleshooting process for future reference. Consequently network professionals cannot share their troubleshooting knowledge with other network professionals. Within the same enterprise the same network professional may need to spend the same amount of time and effort to troubleshoot the same problem which had occurred before.

A generic network troubleshooting process consists of the following tasks:
Define the problem
Gather the data
Analyze the data
Eliminate the possible problem causes
Find the root cause of the problem Many books and papers have been written to analyze the typical actions and decisions that are taken during each of these processes and how these could be planned and implemented via the standard procedures. However these procedures are static, and the process to gather and analyze data (usually via CLI commands) is still a very manual and meticulous process.

The invention of a computer-aided network engineering system, NETBRAIN™ Workstation (as described in U.S. Pat. No. 8,386,593 by the inventors of this application) provides a graphic user interface (GUI) that renders network troubleshooting automation possible. In a GUI-based system, a network structure may be represented with graphic features (icons, lines and menus) that represent corresponding features in a physical network. Such visual representation liberates a network engineer from memorizing the standard or proprietary protocols and the tedious manual tasks of typing.

The inventions provide GUIs for users to write Executable Procedures without having any programming background. After a Procedure is created, it can be run in NETBRAIN™ Workstation in connection with any network system. From start to finish, troubleshooting with a proposed solution may just take a few minutes instead of hours or days traditionally.

SUMMARY

The present application discloses new approaches to troubleshooting a network problem. A system is invented to define a Procedure which can be automatically executed. This type of Procedures is called an Executable Procedure. An Executable Procedure utilizes a visual programming method to enable a CLI-based troubleshooting processes executable and re-useable. It emulates the thinking process of human troubleshooters when they use CLI commands. A network professional without any programming background can also effectively program his know-how and the end result of this programming can be applied to any other type of network by anyone to troubleshoot a similar type of network problems.

In one embodiment, GUIs are provided to define an Executable Procedure. The definitions of an Executable Procedure are divided into a set of visual blocks and each block can be defined with a visual interface.

In one embodiment, by using a GUI, a user defines how to collect data from network devices, how to parse the key information from the data, and the methods to analyze the data and messages to be output when a certain condition occurs. After a Procedure is defined, the system automatically creates an executable application.

In one embodiment, the executable application is enabled to run from within a network map, on one or multiple network devices or through any other input from a user. A Procedure can be re-used to troubleshoot another network problem, create a map, verify the network health and create a report.

In one embodiment, functions that group together a set of processes for gathering data from execution results of network devices and connections are made accessible through a set of corresponding GUIs represented as a Parser.

In one embodiment, functions that group together a set of processes for analyzing data collected from network devices and connections are made accessible through a set of corresponding GUIs represented as a Trigger.

In one embodiment, a set of GUIs are provided to visually display an execution of a set of processes and commands in real time.

In one embodiment, a set of GUIs are provided to visually display identified possible errors and warning messages.

In one embodiment, a set of GUIs are provided to visually display a possible solution to a network problem.

In one embodiment, a set of troubleshooting processes and strategies are saved as a Procedure and are made accessible through a set of user interfaces.

The disclosed innovations, in various embodiments, provide one or more of at least the following advantages. However, not all of these advantages result from every one of the innovations disclosed, and this list of advantages does not limit the various claimed features.

The advantages of a system with a GUI for providing user control and access are obvious—dramatically shortening the learning curves and maximizing efficiency, and therefore enabling a junior network professional to consistently perform complicated network management tasks.

Further any time saved in troubleshooting may mean real money for an enterprise that relies on network stability and network performance. With a visual system running in real time, any network trouble may be identified instantly and therefore be fixed in a shorter period of time.

A well-built Procedure can automatically gather data, analyze data and eliminate possible causes. Besides troubleshooting the network problems, the Executable Procedure can also be used to:

Create a map, for example, mapping an application's path Procedure.

Provide network compliance or health checks.

Create a customized report.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 7 shows an example GUI for displaying execution results of a Procedure in a GUI based network management system in accordance with this application.

FIG. 10 shows an example GUI for defining a CLI command Probe in a GUI based network management system in accordance with this application.

DETAILED DESCRIPTION OF SAMPLE EMBODIMENTS

Figure 1:
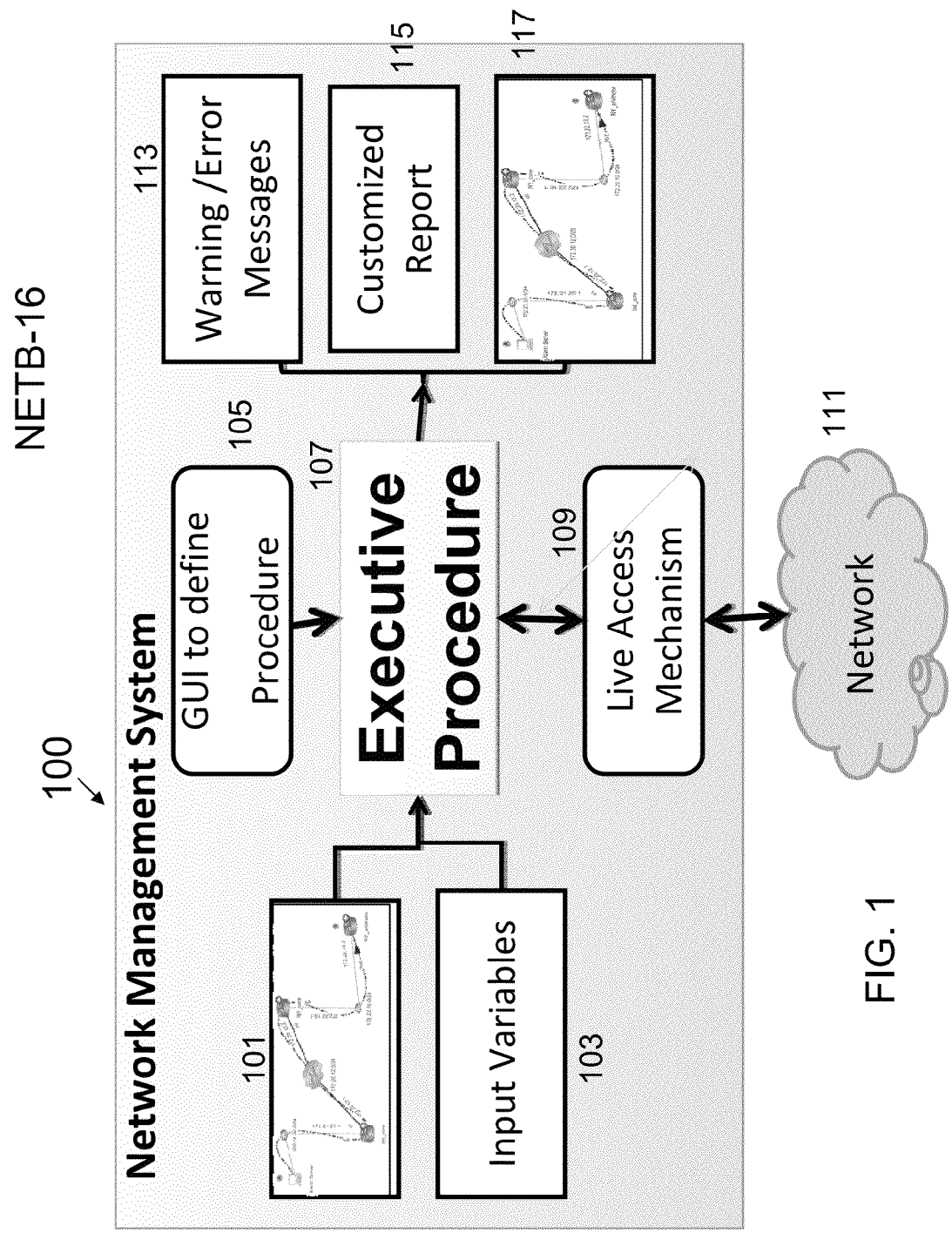
FIG. 1 diagramly shows an example functional interaction flow of an Executable Procedure of a GUI based network management system in accordance with this application.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The present application may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present invention may employ any number of conventional techniques for data transmission, signaling, data processing, network control, and the like.

A particularly powerful tool for understanding network behavior is graphic visualization. A computer-aided network engineering system, NETBRAIN™ Workstation enables automating network troubleshooting possible. A network professional can follow three steps to troubleshoot a problem: map the problem area; probe from the map and compare the current network state with baseline data. With this invention of Executable Procedure, one can select and execute Procedures relevant to the network problem from within a network map. The output of the Procedures may help identify the root cause of the problem quickly.

Background technologies and terminologies are further described in U.S. Pat. No. 8,386,593, the content of which is incorporated by reference.

For network troubleshooting, a network engineer depends on a set of commonly used commands, methods and tools, standard or proprietary of the manufacturers:

The Command Line Interface (CLI): almost all network devices provide CLI commands to check the network status or statistics. For example, in a Cisco IOS switch, the command "show interface" can be used to show the interface status such as input errors.

Ping: a simple tool used to check whether a device can be reachable from another device. For example, after a network change, it is the best practice to ping the main servers from the core network devices to prevent any major outage of the key applications.

Traceroute: a tool to check the route from a device to a destination device. This tool is useful to troubleshoot a connectivity problem.

Configuration management: a system used to find differences of configurations of network devices in a certain period. This is important since about half of the network problems are caused by configuration changes.

Troubleshooting procedures, usually provided by the hardware vendor or the expert in the field, generally comprises the following sequences of actions:

Execute the CLI, ping, traceroute or other commands from the network devices;
Find the key value from the command output;
Compare the key value with a standard value;
Take different actions depending on the key value. For example, execute other commands to further troubleshooting, find the root cause or escalate the issue.

However, each of these steps is generally performed manually on one network device at a time. No tools are yet available to simplify the tedious manual and error prone steps of the various network commands.

With the present invention, GUIs are utilized to provide a visual presentation of network commands, network executable processes and network strategic procedures. These commands and processes are enabled to be visually represented, defined, and made accessible through GUIs and visual symbols as well.

The system includes a GUI to define an Executable Procedure. This user interface provides an easy way to define Procedures (used inter-exchangeably also as Executive Procedure, Executable Procedure) so that a user without any programming knowledge can create a Procedure. After a Procedure is saved, the system creates a standalone application containing executable codes. An exemplary implementation is done by Python Script. Any other suitable types of programming languages can also be used to convert a Procedure defined through the GUI to an executable code.

A "Probe" is a set of functions that retrieves and parses data from a device.

A "Trigger" is a set of functions that defines the logic to analyze data.

A "Process Node" is a visual representation of a block of executable codes that generally include zero to multiple "Probes" and "Triggers".

There are four types of Probes: CLI command Probe runs CLI commands, and parses and analyzes the result; Configuration Probe analyzes the configurations; Ping Probe checks the connectivity between devices; Traceroute Probe runs the traceroute command between two devices.

An "Executable Procedure" (Sometimes called "Procedure") is a set of processes and strategies to achieve a result which can be presented visually through GUI. It may contain multiple Process Nodes and logic workflows from one Process Node to another.

A "Parser" is a set of functions that defines how to retrieve data from the output of an execution of a CLI, ping, traceroute and any other types of commands. Depending on the output formats, for example, four types of Parsers are provided: Keyword, Paragraph, Table and Filter Parsers.

The configured and saved Executable Procedures automate conventional troubleshooting steps. Using the GUI based network management system, NETBRAIN™ Workstation, an Executable Procedure can perform the following tasks automatically:

Issue the command (CLI command/ping/traceroute/SNMP) in network devices and collect the output via a Probe;
Parse the command output to retrieve key data via a Parser;
Analyze the key data via a Trigger;
Output possible errors or warnings and expert advices via a GUI.
Create maps and/or documents for an underlying network system or the troubleshooting process.

In reference to FIG. 1, a GUI based Procedure system 100 for a network management is shown. The system includes a GUI 105 to define an Executable Procedure 107. The Executable Procedure is defined by a set of visual block-based programming interfaces so that a user without any programming background can still effectively program his know-how. After a Procedure is saved, the system creates a standalone application containing the executable codes. An exemplary implementation is done by Python Script though any other type of programming language can be used to convert the Procedure defined through the GUI to an executable code.

Executable Procedure 107 can be executed within a network map 101. A common use case is: a user creates a map 101 to include the network devices and/or network interfaces relevant to a network task, and then selects the relevant Procedures to run. Executable Procedures can also take the user input 103 through a user interface. While a Procedure is performed, it collects the data from various types of network devices in the live network 111 via a Live Access Mechanism 109. The output of an Executable Procedure includes warning or error messages 113, customized reports 115 and network maps 117 with the problem area being highlighted or noted.

Figure 2:
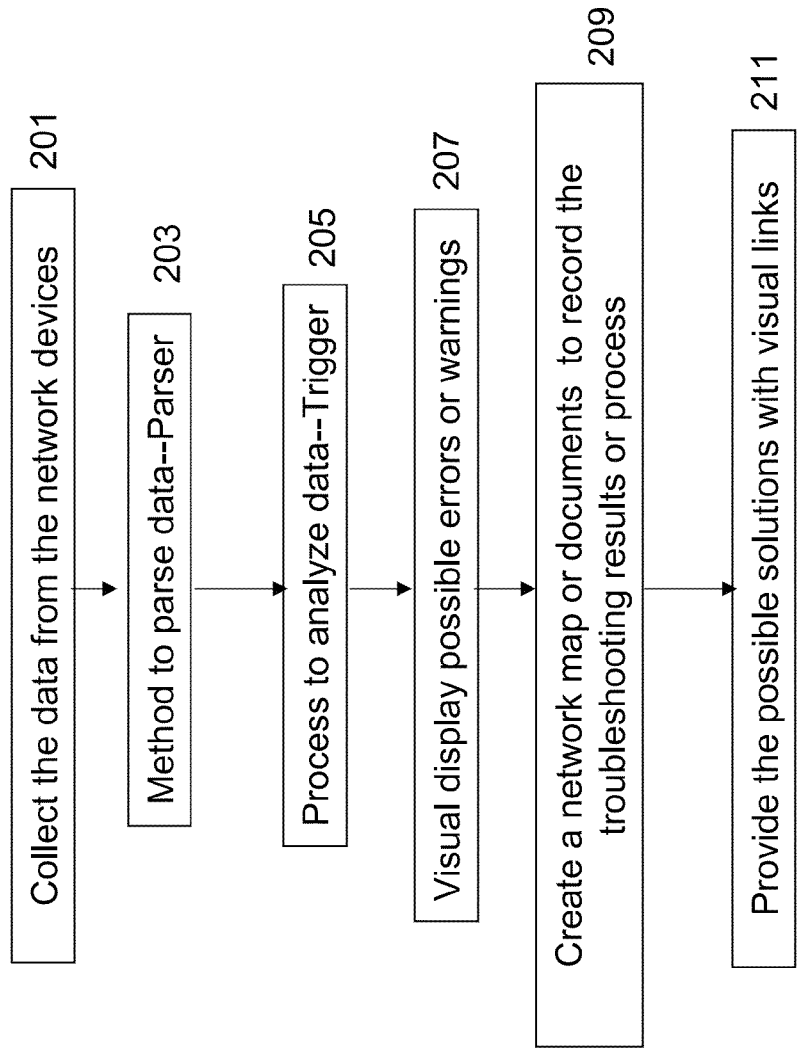
FIG. 2 diagramly shows an example execution flow of an Executable Procedure of a GUI based network management system in accordance with this application.

In reference to FIG. 2, the process of Troubleshooting via an Executable Procedure is illustrated. At step 201, a group of built-in functions are called and executed on a network or a device to collect data; the data is parsed at step 203 to extract key information; then a Trigger is used to analyze the obtained key information at step 205, the results are thus displayed at step 207; a network map or document may be created to record the troubleshooting results or process at step 209, and possible solutions are provided at step 211. The knowledge or logic to troubleshoot a network problem is included in the Procedure and so a network professional does not need to memorize manuals or the steps for a common network problem.

Figure 3:
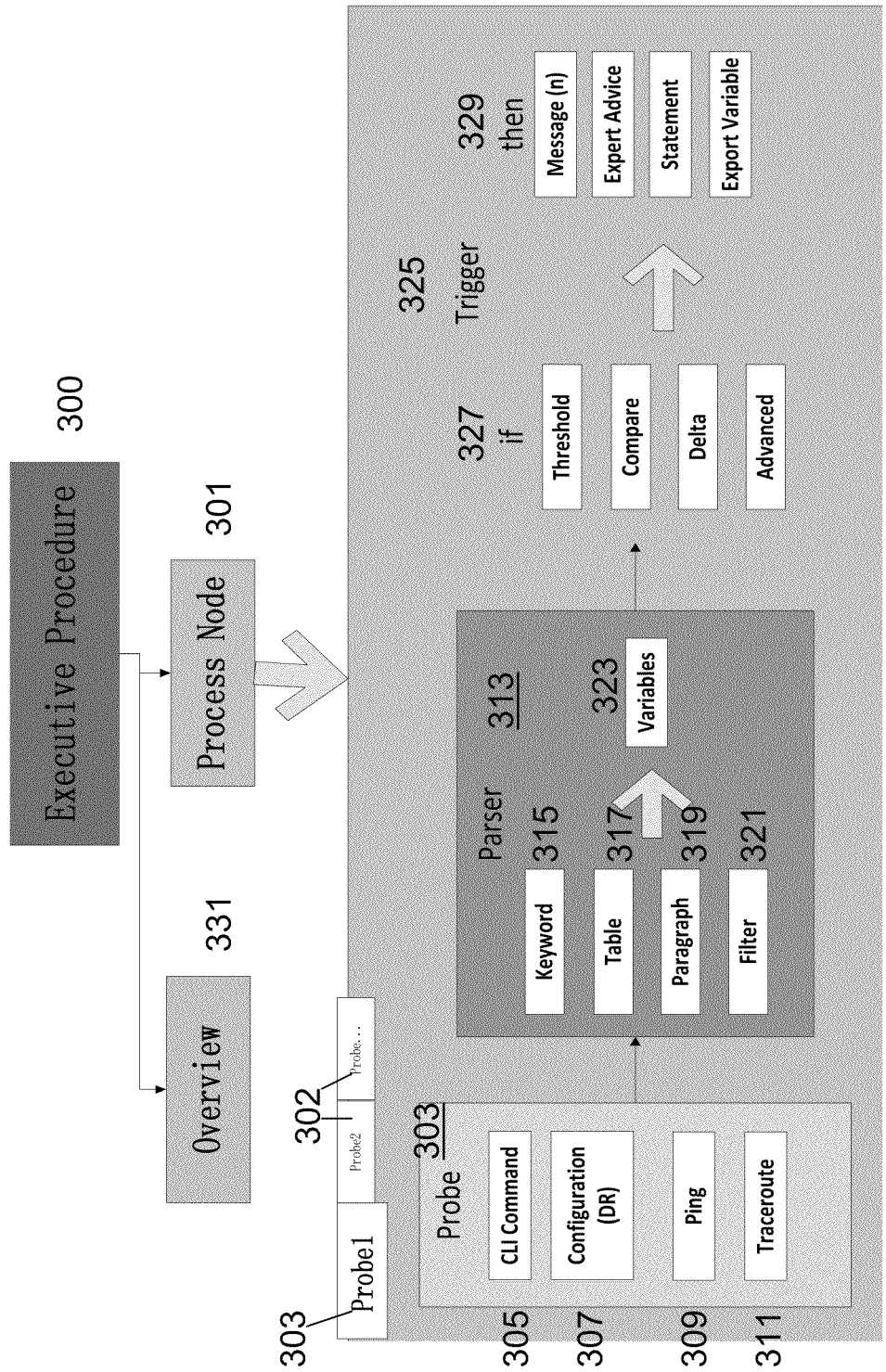
FIG. 3 diagramly illustrates an example building process for construction of an Executable Procedure in a GUI based network management system in accordance with this application.

In reference to FIG. 3, an example Executable Procedure 300 includes various numbers of Process Nodes 301 which further includes various number of Probes (Probe1 303, Probe2 302, . . . etc). Probe1 303 could include a number of combinations of commands, standard functions and/or proprietary functions, such as CLI Command 305, Configuration (DR) 307, Ping 309 and/or Traceroute 311. Process Node 301 also includes a various number of combinations of Parsers 313 which may include Keyword Parser 315, Table Parser 317, Paragraph Parser 319 and/or a Filter 321. Process Node 301 also includes a various number of combinations of Triggers 325 that defines a various set of "If" and "Then" analysis logic loops 327 and 329. Trigger 325 may include a various number of settings, for example, the settings for Threshold, Compare, Delta and/or Advanced settings. Variable output 323 from Parser 313 is thus analyzed automatically with the pre-set conditions of normality or abnormalities.

Node 331 is an Overview Node that may be provided to include the description, as to what the Procedure does, the author and the sample map.

A Process Node may be configured to finish a single task and is the programming unit of an Executable Procedure. Each Node is conceptually executed on one device at a time, although a built-in logic loop allows the same logic to be executed across a dynamic set of devices. A Process Node may contain zero to multiple Probes and Triggers. A Probe retrieves and parses the data from a device. A Trigger defines the logic to analyze the data. There are four built-in Probes corresponding to the common tools for the network management:

CLI command Probe is to run CLI command, parse and analyze the result. Configuration Probe is to analyze the configurations. Ping Probe is to check the connectivity between devices. Traceroute Probe is to run a traceroute between two devices.

Besides these Probes, the system can expand to other Probes such as SNMP Probes, retrieving the data via SNMP and analyzing the data.

A Parser defines how to parse the data from the sample output. Depending on the formats of the sample output, Parsers may parse the data using a Keyword, Paragraph, Table and Filter parser.

Keyword Parser is a Parser to retrieve a single instance of the data; for example, to retrieve the IOS version from the output of "show version" command.

A Paragraph Parser is for parsing the data if the original data (configurations or CLI command output) includes multiple repeating instances of the data; for example, to retrieve the CDP neighbor entries from the output of the "show cdp neighbors" command.

A Table Parser is for parsing the data if the CLI command output is formatted as a table; for example, to retrieve EIGRP neighbor details from the command "show ip eigrp neighbor".

A Filter Parser is for parsing the data if you want to filter a partial data from the original data.

The data retrieved from the parser are stored in various output variables.

A Trigger defines the control flow to analyze the output variables retrieved by the Parser. For example, a Threshold Trigger can run a Parser once and compare a variable with a threshold value. For example, a Threshold Trigger can compare the CPU usage of network devices with a threshold value, such as 90%. If the CPU usage is higher than this threshold value, a warning message is created.

A Compare Trigger can run a Parser against two data sources (live data and baseline data) and check whether a variable changes. For example, Compare Trigger can compare configurations retrieved from a live network with benchmarked configurations and output any difference.

A Delta Trigger can run a Parser twice with a certain time interval and checks whether a variable changes. For example, a Delta Trigger can retrieve CRC errors of a network interface within a certain interval such as 5 seconds, and if the CRC errors increase, an error message is created indicating that the cable connected to this interface does not work properly If the other Triggers do not find the problem, an Advanced Trigger which provides advanced options may be used.

The general logic for a Trigger is as follows:

```
if (condition1)
    action block 1
else if (condition 2)
    action block 2
else
    action block 3
```

Under the conditions is an action block that the system conducts under each condition. Each action block can include multiple messages, one block of expert advice, one statement block, one export variable block, and one control action probe.

The message will be shown in the Message fields in a Procedure Task (the GUI to show Procedure results after the Procedure is run). There may be three types of messages: the error message indicating an error requiring an immediate action, the warning message indicating something abnormal occurred, which requires attention, and the information message.

The Expert Advice field is pure text for the Procedure user to give advice if a specified condition occurs. It will be displayed in the Procedure Task window when a user views the detail of a message.

The Statement fields can be any executable code such as making function calls to draw a map or creating customized fields for device properties.

Figure 4:
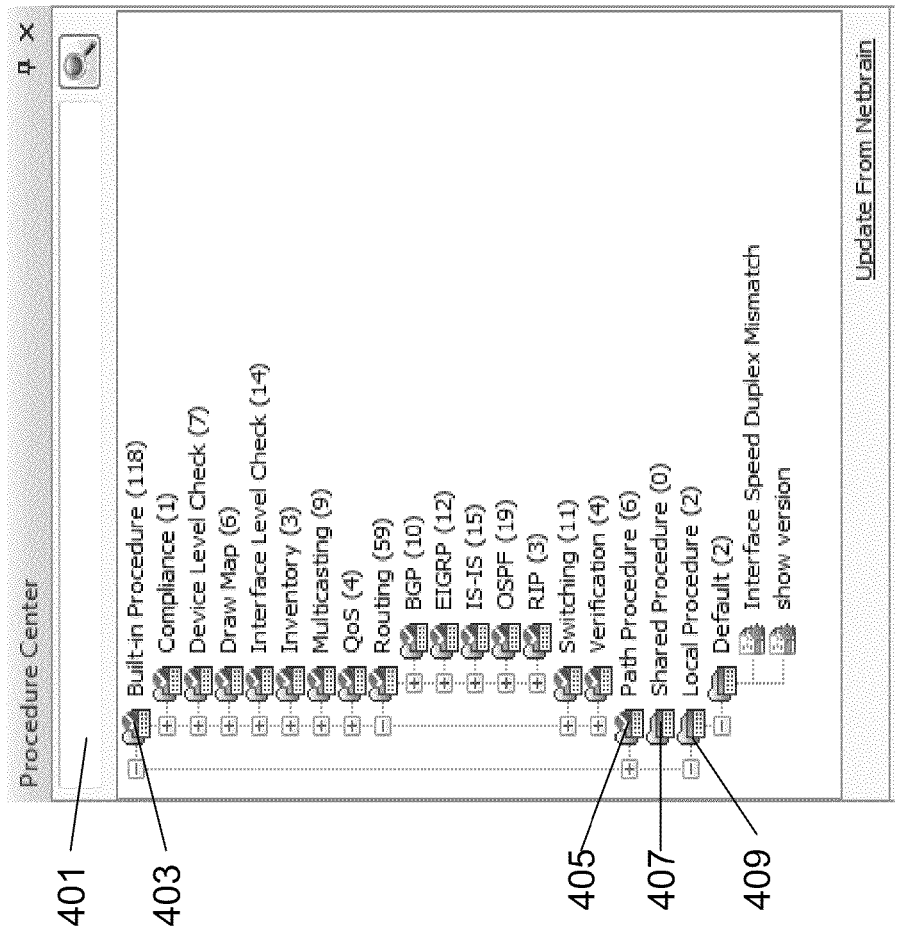
FIG. 4 shows an example GUI of a Procedure center for managing various Procedures in a GUI based network management system in accordance with this application.

The Executable Procedures can be organized by category. In one example implementation, in reference to FIG. 4, a Procedure Center 400 is provided to manage the Procedures. Built-in Procedures for common use cases are provided under the built-in category 403, but a user created Procedure can also be placed and managed here and shared through a common server. By sharing the Executable Procedures inside an enterprise or across network professionals around the world, some common types of network problems can be quickly solved by running shared Executable Procedures. There are other categories of Procedures, such as Path Procedure 405, Shared Procedure 407 and Local Procedure 409.

At the top of the Procedure Center is search box 401, where a keyword (for example, "eigrp") can be entered and the Procedures matching the keyword will be found.

For Built-in Procedures, they may be categorized by the following use cases: Compliance, Device Level Check, Draw Map, Interface Level Check, Inventory, Multicasting, QoS, Routing, Switching and Verification. A category can also have subcategories. For example, the routing Procedure may have five subcategories: BGP, EIGRP, ISIS, OSPF and RIP.

For Path Procedures, they are a special type of Procedures used to discover the path between two end points. There are built-in path Procedures and customized Procedures.

For Shared Procedures, they are saved in a common database of the network management system and can be accessed by any client.

For Local Procedures, they are only saved on the local disk and not shared with others.

The Procedures are often run from within a network topology map. A common use case is: the user creates a map for the network devices relevant to a network (for example, the problem area for a troubleshooting task). Then he runs the Procedures from within the map to gather data, analyze data and eliminate possible causes.

Figure 5:
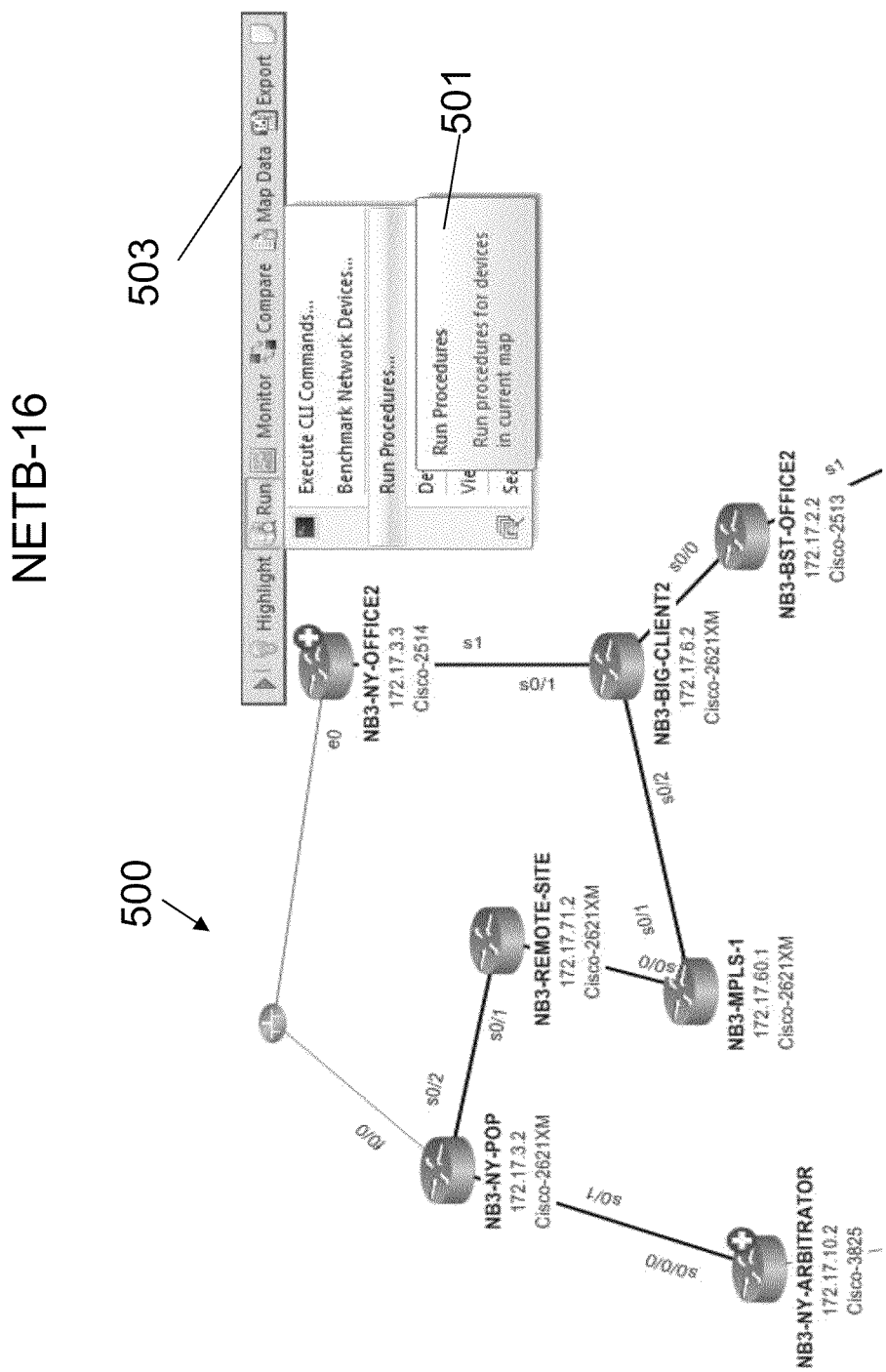
FIG. 5 shows an example method to run a Procedure within a network device map in a GUI based network management system in accordance with this application.
Figure 6:
FIG. 6 shows an example user interface for selecting Procedures to run in a GUI based network management system in accordance with this application.

FIG. 5 shows an example implementation to run a Procedure within a map 500. A run procedure menu 501 is added in the float menu 503 of the map. After a user clicks Run Procedure in Menu 501, a window shown in FIG. 6 is displayed for the user to select Procedures from the Procedure Center. The user can click the + sign in front of any category and select Procedures in the Procedure Center to run that Procedure.

Figure 7:
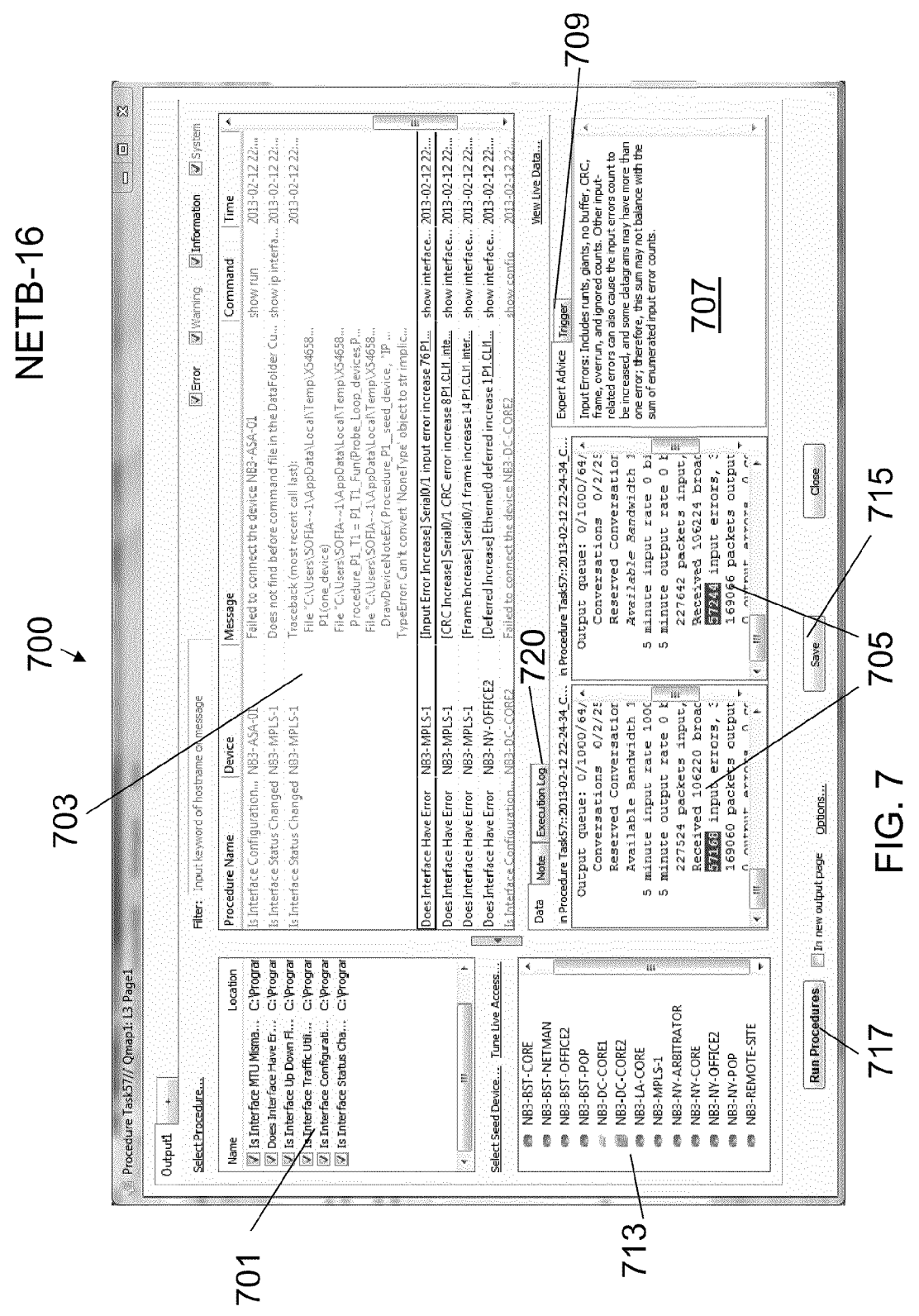

FIG. 7 is a Procedure Task window 700 to display Procedure results. The selected Procedures are listed in Pane 701 and all messages relevant to this Procedure are displayed in Pane 703. If selecting a Procedure in Pane 701, then only the messages of this Procedure are displayed in Pane 703. A user can also select the type of messages to be displayed. For example, by only checking the Error checkbox and unchecking other checkboxes a user can only view error messages. Details of a selected message are displayed in Pane 705. The command output related to this message is also shown in Pane 705. The expert advice is shown in Pane 707 and the trigger to print out this message is shown in Pane 709. The execution log for the whole Procedure Task can also be displayed in Pane 705 when the tab Execution Log 720 is selected. The execution log displays the details on how the Procedures are executed.

The network devices on which the Procedures are run are listed in Pane 713. You can use the Select Seed Devices link to add more devices. Or, you can remove one or multiple devices by right clicking and selecting "Remove" from the menu.

The Procedure tasks can be saved as a file by clicking the Save button 715. The saved Procedure Task can be opened for future examination or be sent to a peer for review. Also the Run Procedure button 717 allows a user to rerun a Procedure Task.

Figure 8:
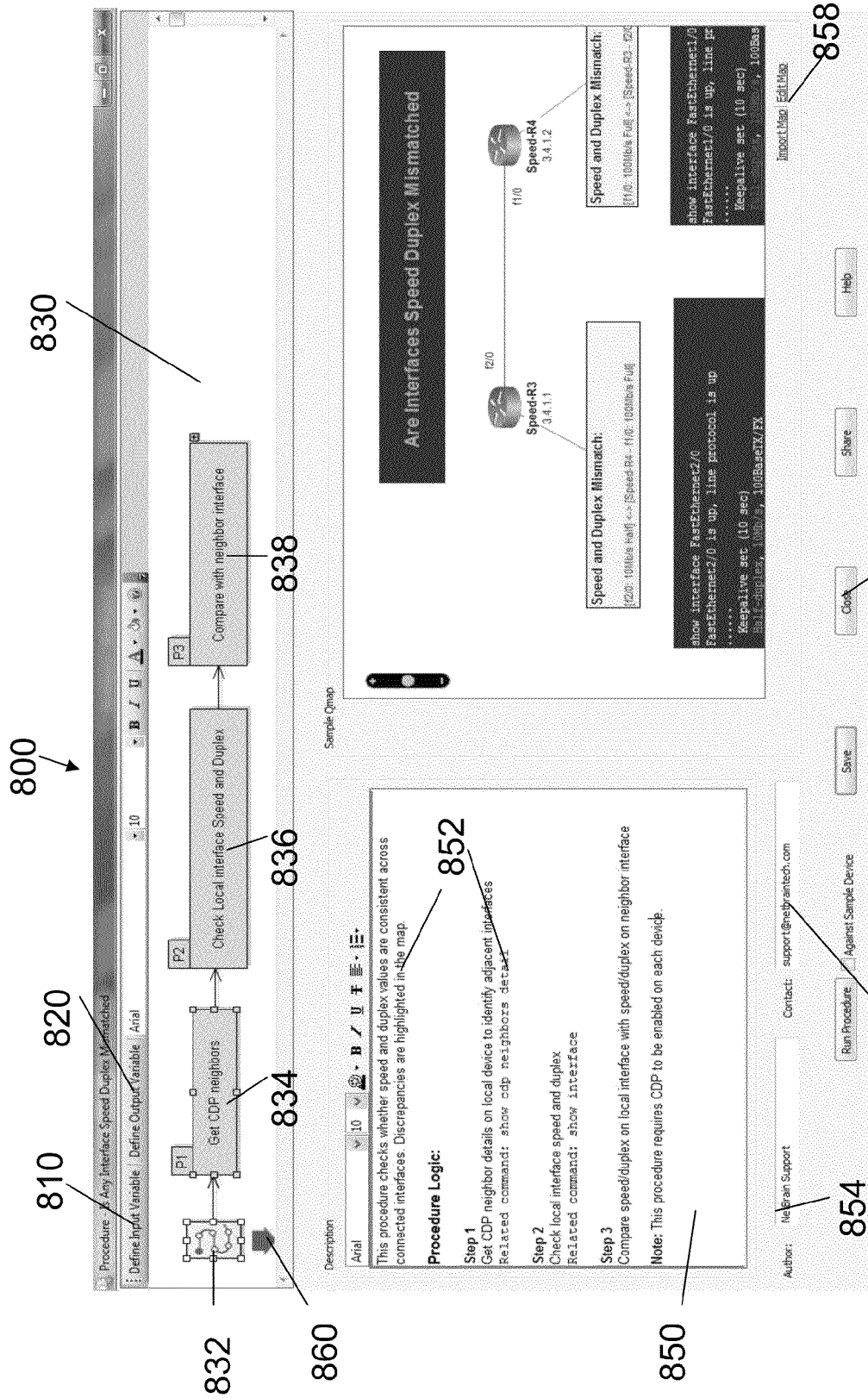
FIG. 8 shows an example Procedure that has three Process Nodes in a GUI based network management system in accordance with this application

FIG. 8 shows an Executable Procedure example window 800. This example Procedure is used to check whether the speed or duplex of the neighbor interfaces are mismatched. The Buttons 810 and 820 are used to define the global input and output variables of a Procedure, which will be discovered in detail later. The flow chart in the upper pane 830 describes the overall flow of the Procedure. A Procedure has the summary Node 832 and one or more Process Nodes. In this example there are three Process Nodes 834, 836 and 838. The lower pane 850 shows the details of the current Node (the Node with the arrow 860 under it). Click any node to set it as the current node.

In the summary node 832, a user can enter a description 852 to describe what the Procedure is for, its author 854, and its contact 856. The link Import Sample Qmap 858 can be used to import a map to illustrate the problems this Procedure tries to solve.

In this example, the description 852 gives the summary of the Procedure and steps to solve the problems:

This procedure checks whether speed and duplex values are consistent across connected interfaces. Discrepancies are highlighted in the map.
Step 1
Get CDP neighbor details on local device to identify adjacent interfaces
Related command: show cdp neighbors detail
Step 2
Check local interface speed and duplex
Related command: show interface
Step 3
Compare speed/duplex on local interface with speed/duplex on neighbor interface Note:
This procedure requires CDP to be enabled on each device.

Without any automation it may take a few days to perform these steps. With the Executable Procedure Interface, three process nodes 834, 836 and 838 are created to execute corresponding steps 1, 2 and 3 in minutes.

After the Procedure is defined, click save button 870 to save the Procedure. The Procedure will be saved as a file with the specific file name, for example, .qapp (meaning the quick application).

Figure 9:
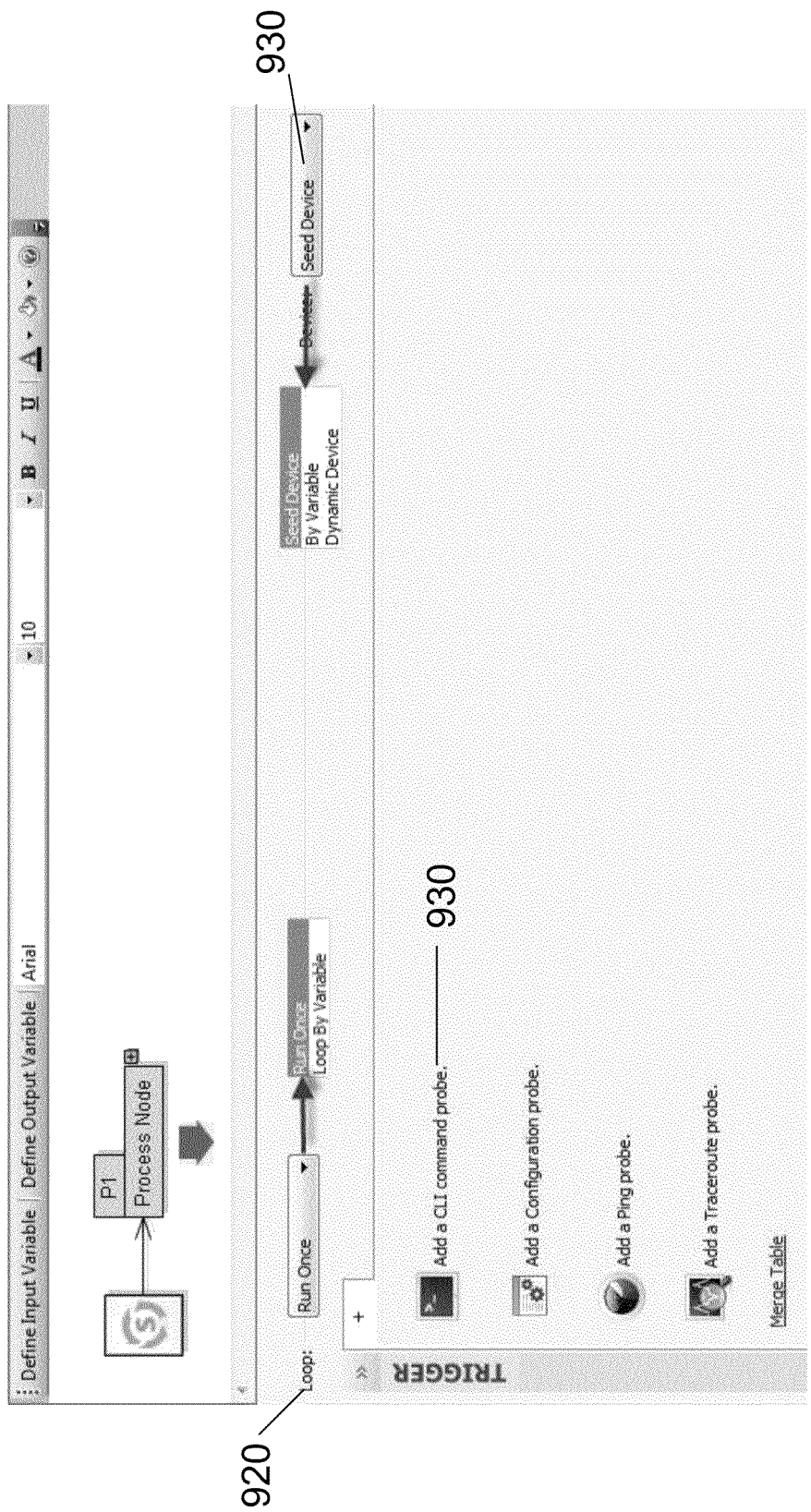
FIG. 9 shows an example GUI for defining a Process Node in a GUI based network management system in accordance with this application.

FIG. 9 shows how to define a Process Node. For example, two options may control how the Process Node is run by Loop 920 and Devices 930. The Loop option defines the loop for the block of codes corresponding to the Process Node. The Devices option defines what network devices the Node should be run on.

There may be two options for Loop 920: Run Once, which means that the Node will only run once for each seed device, and Loop by Variable, meaning that the Node will run for each element of the variable.

There may be three options for Devices Option 930: Seed Device, By Variable and Dynamic Device. The default option Seed Device means that the Node will run on the seed device. The seed devices are selected by the user while running the Procedure. The option By Variable means that the node will run on the devices defined by the variable. The option Dynamic Device is used to run the Procedure recursively until a certain condition is satisfied. The Dynamic Device option can be used to map out the topology from a seed device.

Figure 10:
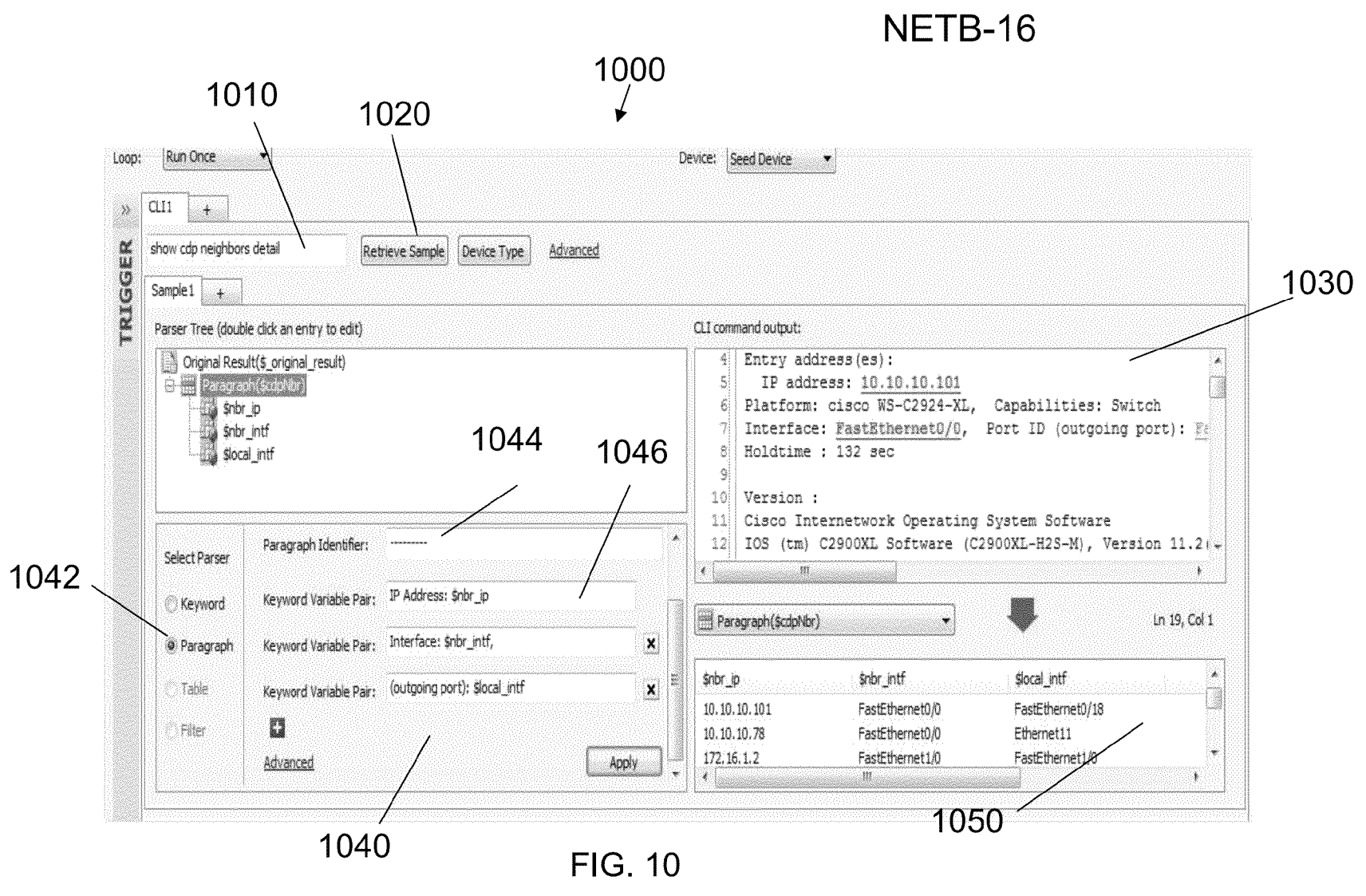

The user can select one of the four types of Probes. For example, by clicking "add a CLI command Probe" 930 to define the CLI command probe, a window 1000 is shown (FIG. 10).

A user may first enter the CLI command in field 1010. In the example here, the CLI command, "show cdp neighbors detail", is used to retrieve the neighbor device and connected interfaces. Second a user may retrieve a sample output to define a Parser. Click the Retrieve Sample button 1020 and select a device. The sample output is shown in field 1030. The following is an example Sample output:

lablosSwitch3>show cdp neighbors detail
-------------------------
Device ID: 2900XL-1
Entry address(es):
    IP address: 192.168.1.210
Platform: cisco WS-C2924C-XL, Capabilities: Trans-Bridge Switch
Interface: FastEthernet0/3, Port ID (outgoing port): FastEthernet0/5
Holdtime : 150 sec
Version :
Cisco Internetwork Operating System Software
IOS (tm) C2900xl Software (C2900xl-C3H2S-M), Version 12.0(5)WC5, RELEASE SOFTWARE (fc1)
Copyright (c) 1986-2002 by cisco Systems, Inc.
Compiled Tue 28-May-02 11:11 by devgoyal

```
advertisement version: 2
Protocol Hello: OUI=0x00000C, Protocol ID=0x0112; payload len=27,
value=
00000000FFFFFFFF010121FF00000000000005080703CC0FF0001
VTP Management Domain: "
Native VLAN: 1
Duplex: full
Management address(es):
------------------------
Device ID: NY_POP
Entry address(es):
        IP address: 172.22.20.2
Platform: cisco 2500, Capabilities: Router
Interface: FastEthernet0/7, Port ID (outgoing port): Ethernet0
Holdtime : 160 sec
Version :
Cisco Internetwork Operating System Software
IOS (tm) 3000 Software (IGS-IN-L), Version 11.1(10), RELEASE
SOFTWARE (fc1)
Copyright (c) 1986-1997 by cisco Systems, Inc.
Compiled Mon 10-Mar-97 15:53 by dschwart
advertisement version: 1
Management address(es):
```

By using the provided Sample output, a user can define a set of Parsers with window 1040 for the Procedure to retrieve the data from a running output. Depending on the sample formats, you can select four types of Parsers: Keyword, Paragraph, Table and Filter.

The sample output includes multiple neighbors. The output of each neighbor has identical formatting. For this type of output, select the Paragraph parser 1042 to parse the data. The Paragraph Identifier 1044 is the keyword to identify the start of a new paragraph, '--------------' in this sample. For each paragraph you can define the keyword/variable pair 1046 (keyword parser). The keyword is the string which is always the same and the variable value is the value which can change. In this example, we define three keyword variable pairs:

```
            IP Address: $nbr_ip
            Interface: $nbr_intf,
            (outgoing port): $local_intf
```

The matched values are highlighted in the sample output and also shown in the pane 1050.

Figure 11:
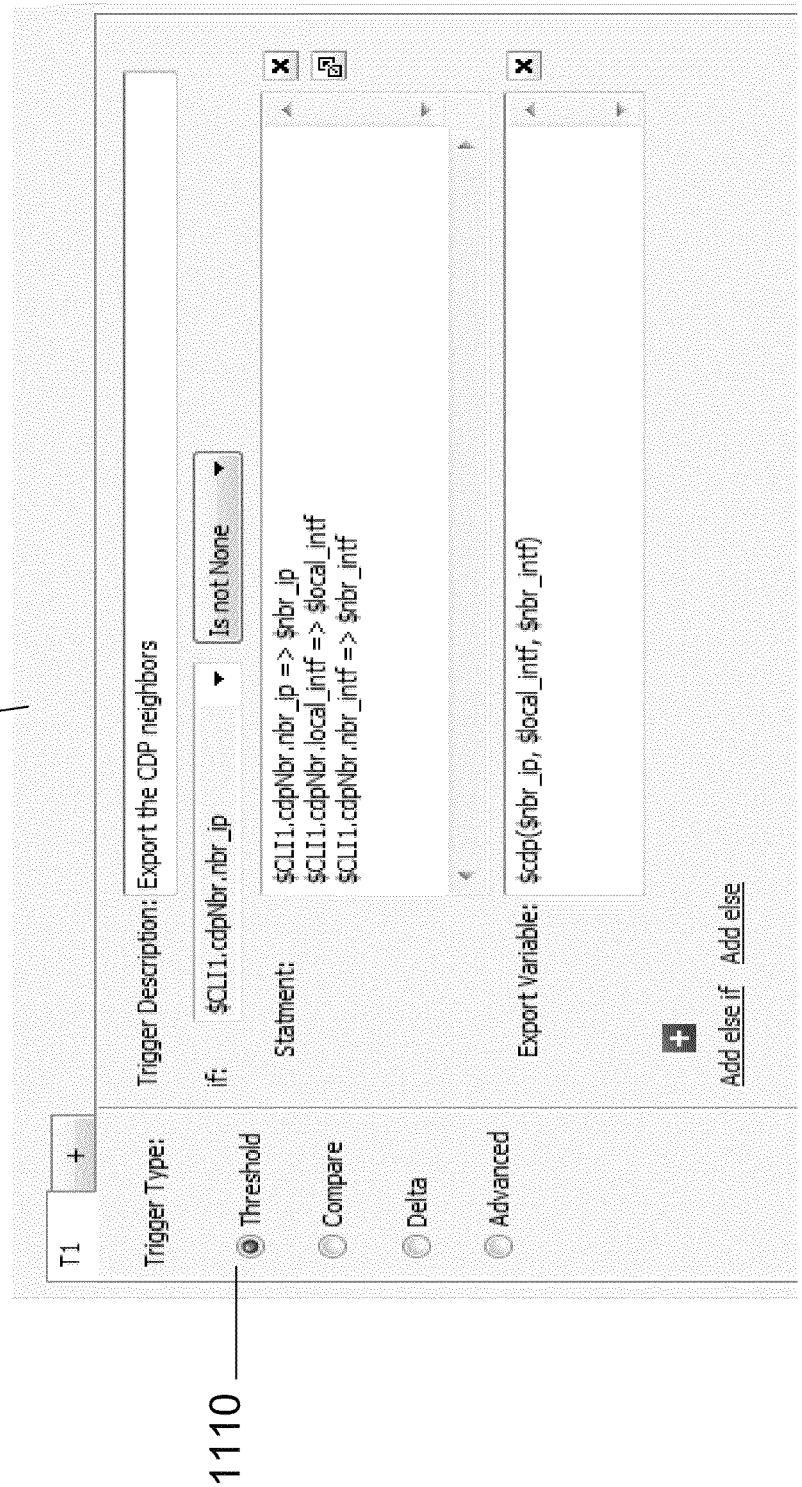
FIG. 11 shows example GUI for defining a Trigger in a GUI based network management system in accordance with this application.

FIG. 11 shows an example window 1100 to define a Trigger. This threshold trigger 1110 checks whether one of the variables defined in the parser Is "Not None". If so, it executes the statements to assign variables and then export these variables so that the process nodes after this process node can use them.

Figure 12:
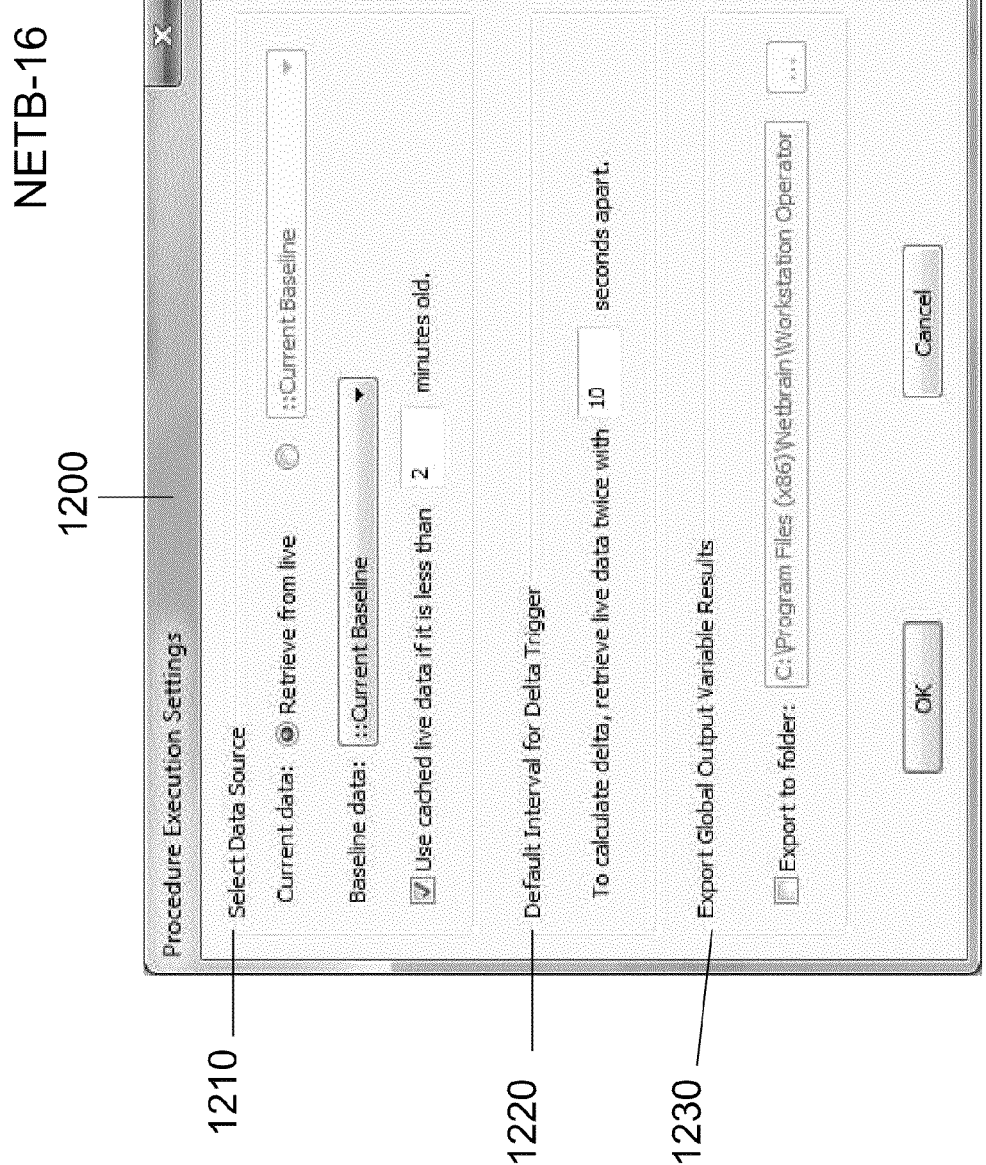
FIG. 12 shows an example GUI for defining a set of running settings to execute a Procedure in a GUI based network management system in accordance with this application.

FIG. 12 shows an example GUI 1200 with the settings to run a Procedure. There are three types of settings: 1) Data Source 1210. By default, a standard Procedure retrieves the data from the live network. However, you can set the option to use cached data stored in a data folder. In the Trigger, the current data is compared with the baseline data. By default, the current baseline serves as the baseline data. You can also select another data folder for the baseline data. 2) Default interval for Delta trigger 1220. For the Delta trigger, the data will be retrieved twice, with the interval value defined here. 3) Export global output variable results 1230. Check this option to export the global output variables and select a file directory for the export.

A Procedure can have input variables and output variables like an application. The input variables allow a Procedure to be run in different environments without any modification.

Figure 13:
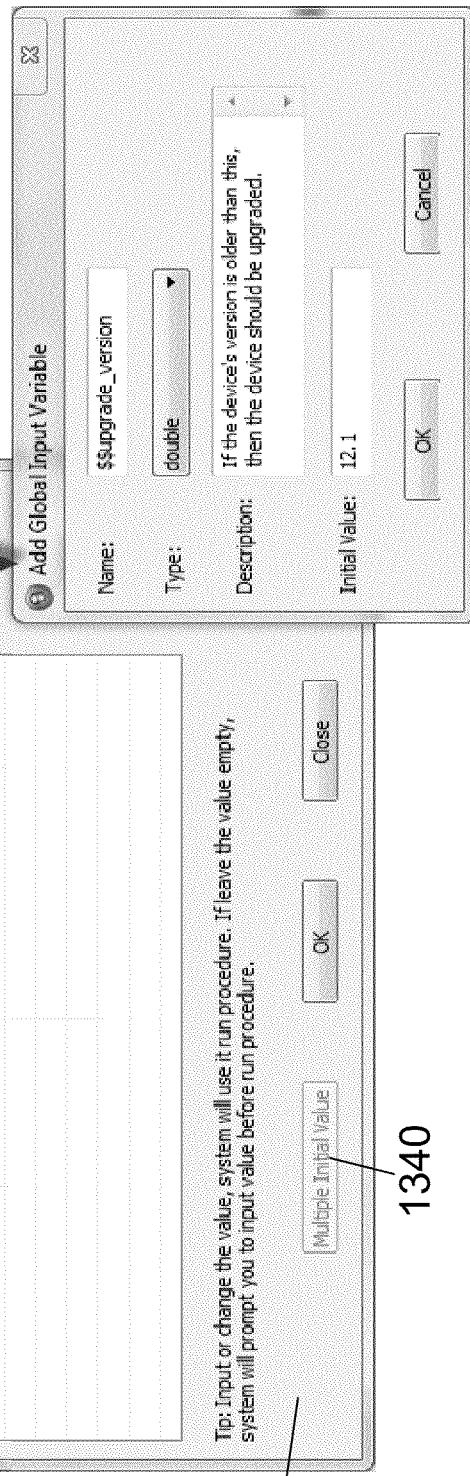
FIG. 13 shows an example GUI for defining a set of input variables to execute a Procedure in a GUI based network management system in accordance with this application.

FIG. 13 shows an example implementation on how to define input variables for an Executable Procedure. To define a global input variable, click the Define Input Variable button 1310 at the top of the Procedure window. In the Define Global Input Variable window 1320, click the Add button 1330 to add the input variables. In the Add Global Input Variable window, enter the variable name and select the type. In our example implementation, the global variables always starts with $$ to differentiate with the local variables of a process node. Other options of symbols may also be used or implemented. The description is optional, but a meaningful description can make the Procedure easy to read and use. The initial value is also optional and should be set to the most frequently used values if possible. Click the Multiple Value link 1340 to set more than one value and the system will run the Procedure with each value. This can be convenient in some cases, for example, if we create a Procedure to map a multicasting source tree, we can run this Procedure with the input variable set to multiple sources.

Figure 14:
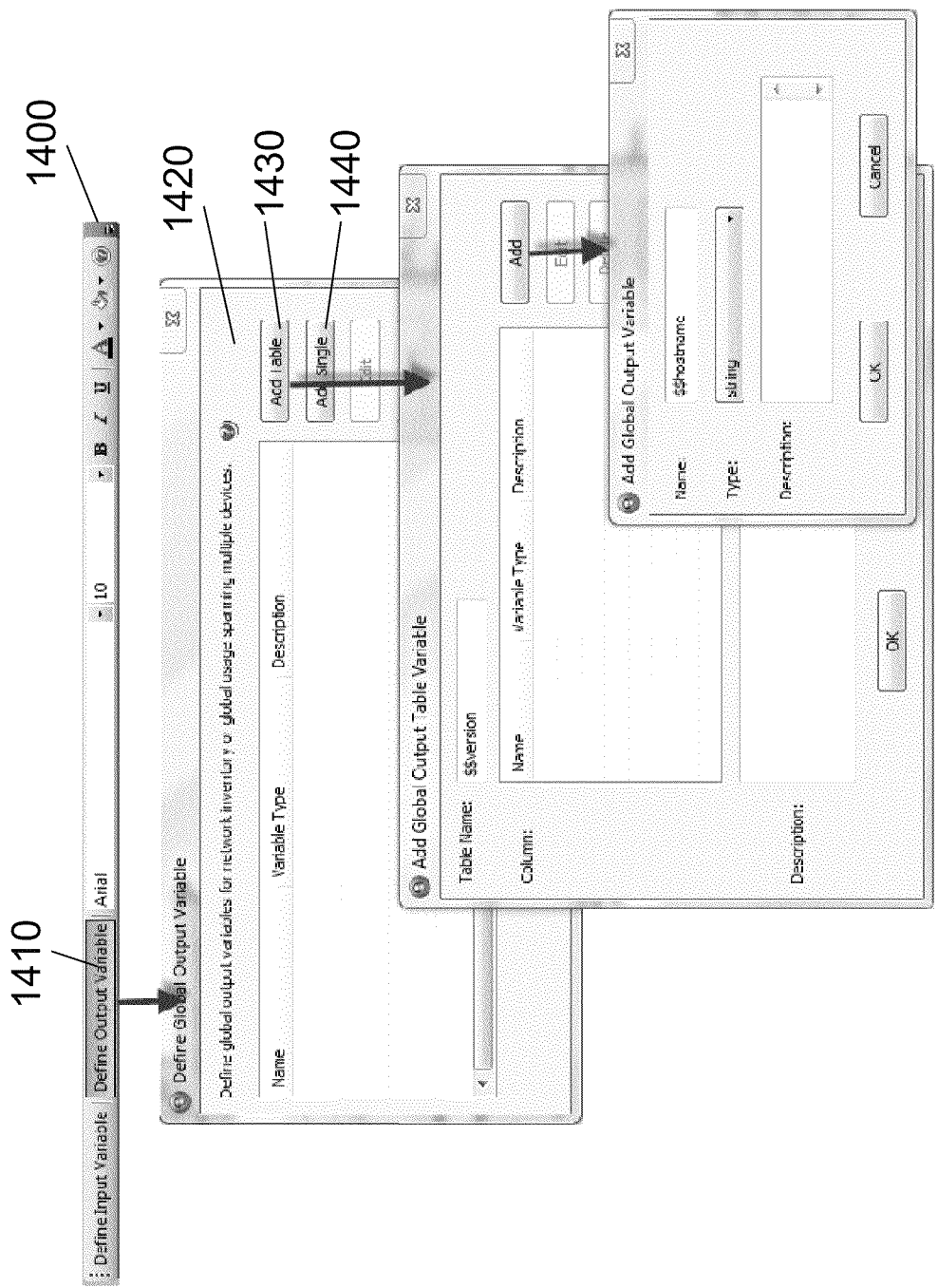
FIG. 14 shows an example GUI for defining a set of output variables to execute a Procedure in a GUI based network management system in accordance with this application.

FIG. 14 shows an example implementation on how to define output variables. One of the primary purposes of the global output variable is to create a report. For example, you may want to create a report to include all devices and neighbor interfaces having the duplex or speed mismatched.

To define output variables, click the Define Output Variables button 1410 at the top of the Procedure window 1400. In the Define Global Output Variable window 1420, click the Add Table button 1430 to add a variable table or the Add Single button 1440 to add a basic variable. Like the global input variable, the global output variable should start with $$. A table can have many columns and each column can have different types of variables.

Besides the CLI command probe, the system also supports the Ping, Traceroute and Configuration Probes.

Figure 15:
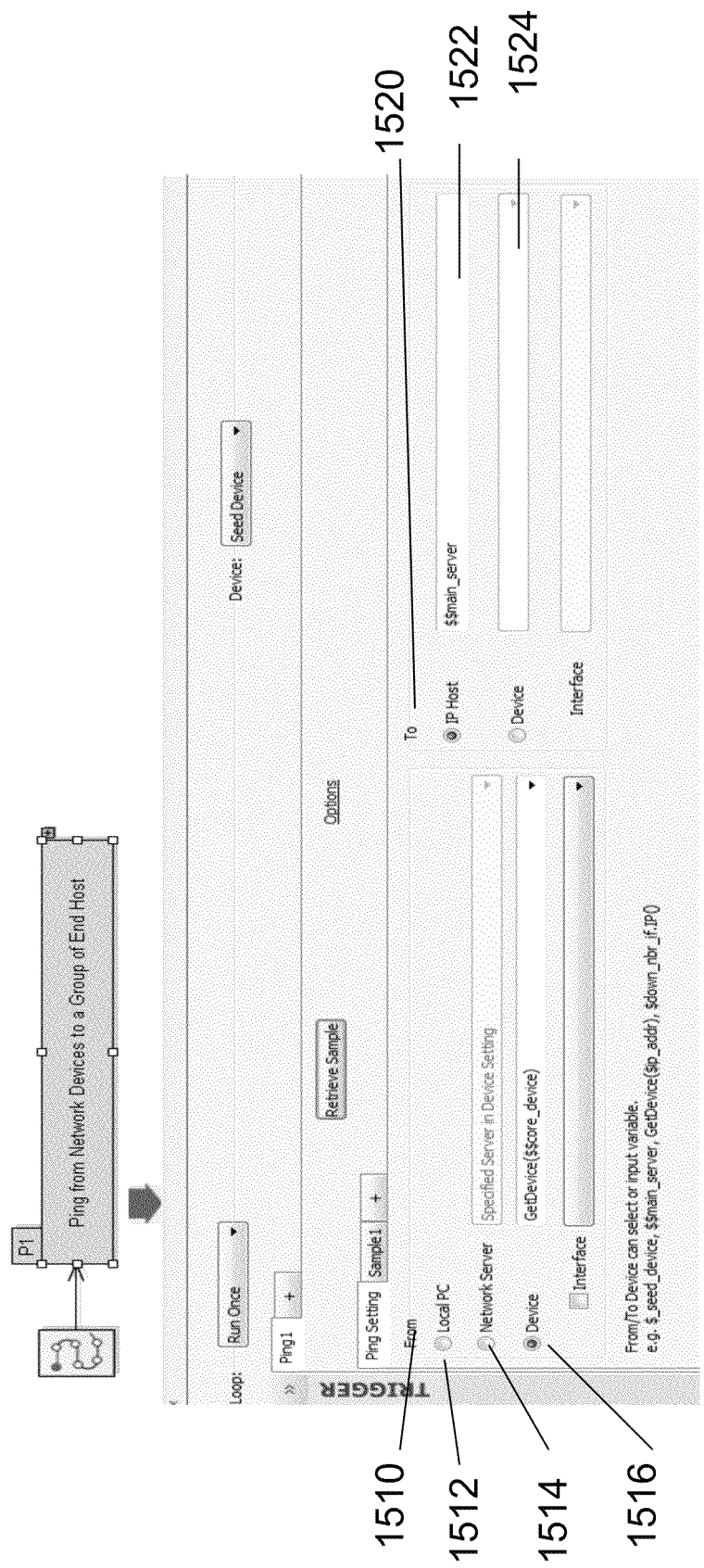
FIG. 15 shows an example GUI for defining a Ping Probe in a GUI based network management system in accordance with this application.

FIG. 15 shows how to define a Ping Probe. Mainly you need define the source 1510 (the device to ping from) and the destination 1520 (the IP to ping to). For the source 1510, you have three options: local PC 1512; the network server 1514, which is a specified server used to work as a proxy to the live network; or the selected devices 1516, where you can define a list of core devices as the input variables and ask the system to ping from these devices.

For the destinations 1520, you can either enter the IP address 1522 to ping from or select a device 1524 and then an interface on the device. In the example shown here, we check the IP Host option and enter the input variable which defines the IP address to ping to.

Figure 16:
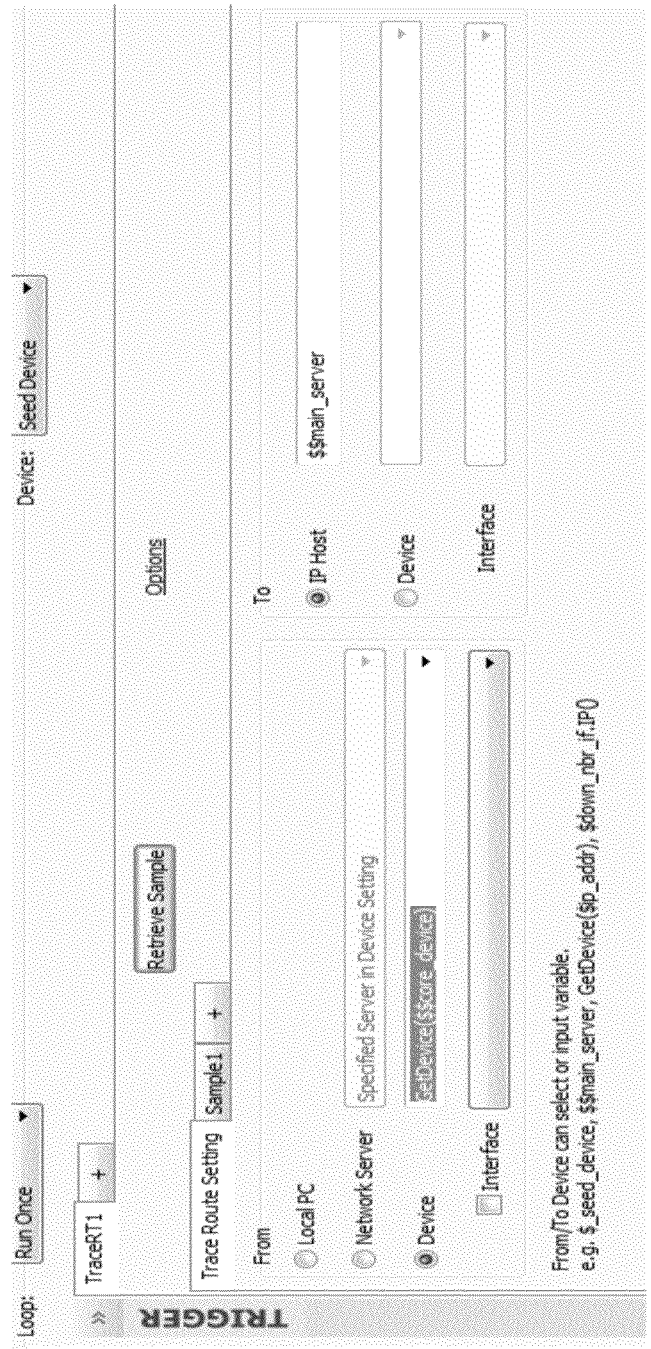
FIG. 16 shows an example GUI for defining a Traceroute Probe in a GUI based network management system in accordance with this application.

FIG. 16 shows how to define the Traceroute Probe. The definition of the Traceroute Probe is similar to the Ping Probe. Ping and Traceroute Probes can be defined to run in a list of core network devices to a list of main servers after a network change. This automation can be much quicker and more reliable compared to the manual process.

The Configuration Probe enables one to parse and highlight configurations. For example, the Configuration Probes can be used in the following use cases: 1) to create a report for the devices containing a particular configuration line, for example, finding the devices with the "no service password-encryption" configuration, which violates basic security policies; 2) to highlight or draw a particular configuration in the Q-map; or 3) to do a preliminary check before applying an additional Procedure. This can improve the Procedure performance since the configuration probe uses the baseline configurations without retrieving data from the devices. For example, we can check whether OSPF is configured to run on a router before applying any Procedure to troubleshoot OSPF routing issues.

Figure 17:
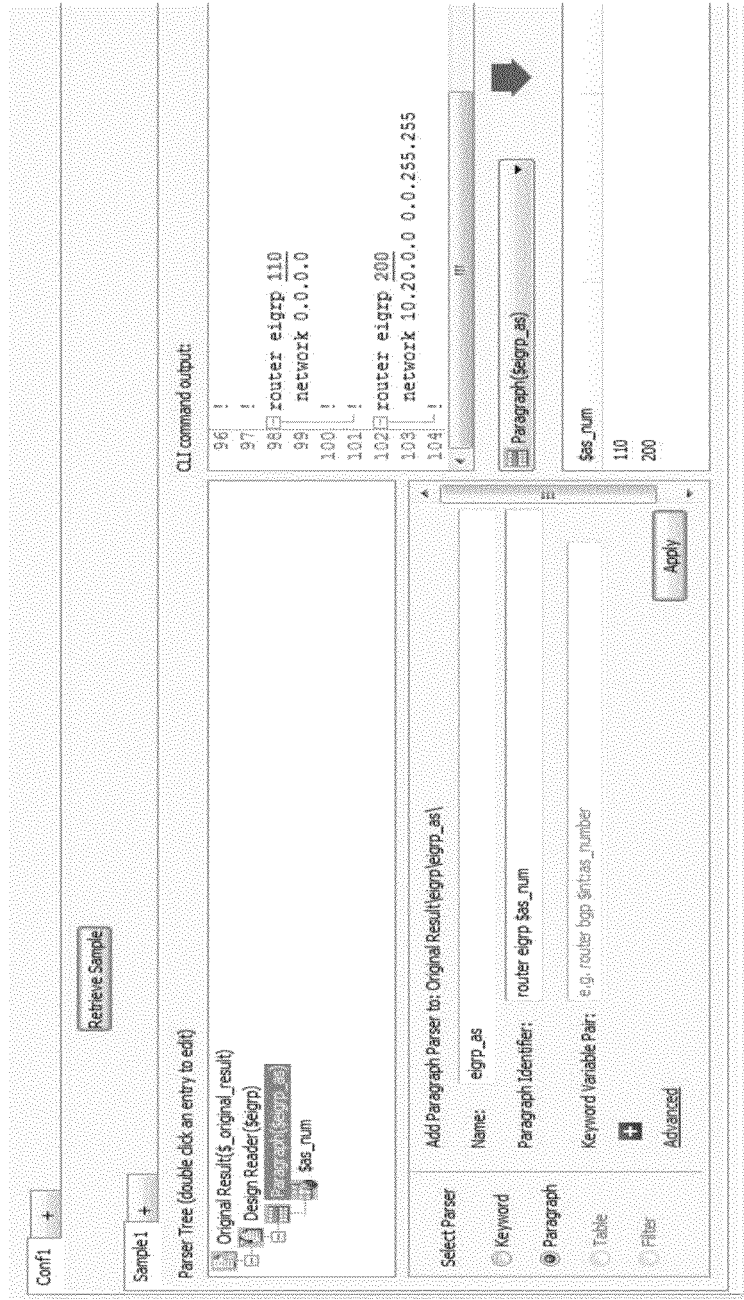
FIG. 17 shows an example GUI for configuration of a Probe Parser in a GUI based network management system in accordance with this application.

FIG. 17 shows how to define a configuration probe. The Parser and Trigger of a Configuration Probe are the same as those of the CLI command Probe. The differences may be that the Configuration Probe only works on configurations, and you do not need to define a CLI command to retrieve the data.

Figure 18:
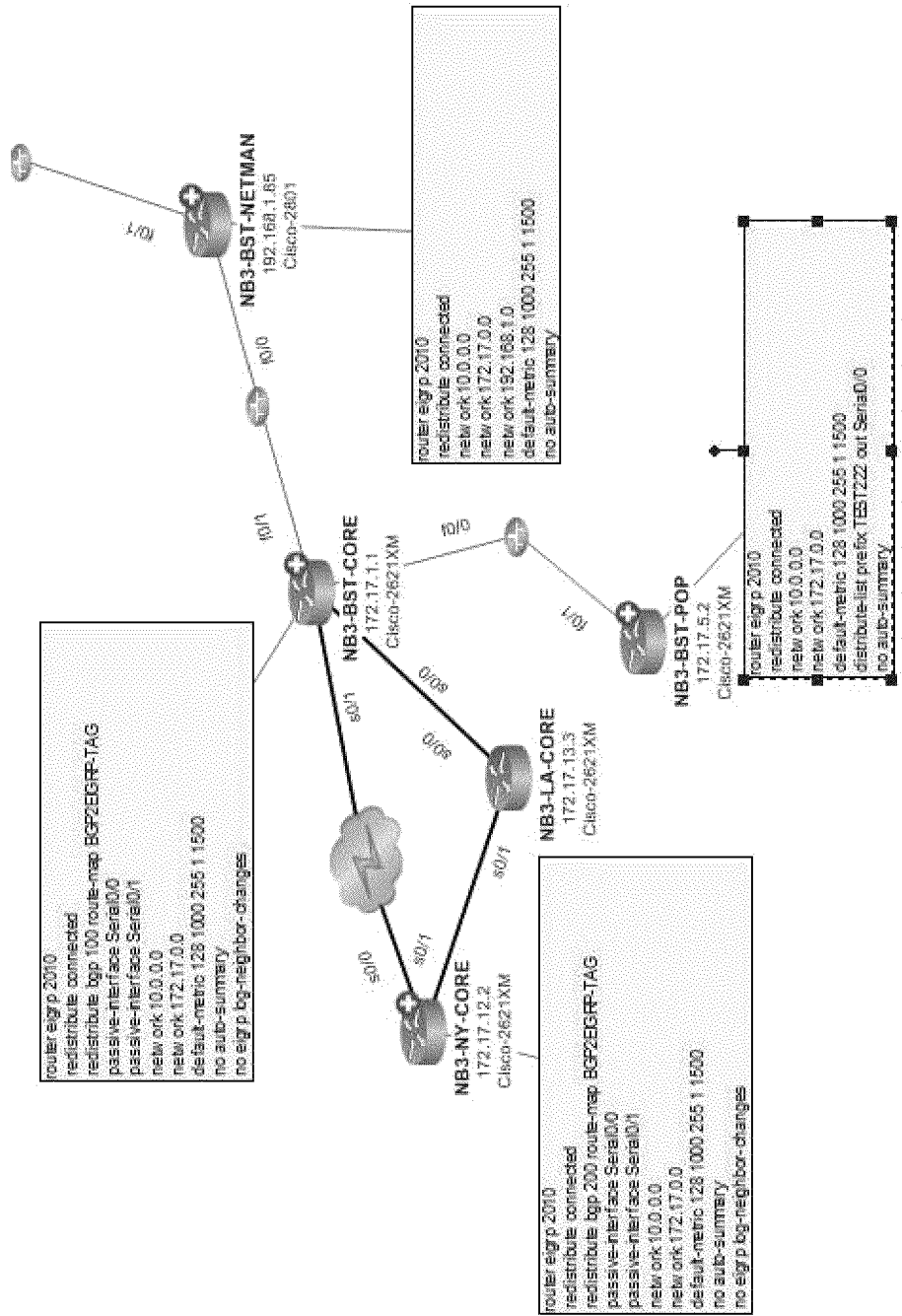
FIG. 18 shows an example a network map created by using a Procedure in a GUI based network management system in accordance with this application.

FIG. 18 shows an example a network map created by using a Procedure.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A graphic user interface (GUI) based network management system having computer processors, comprising:
    a first set of computer processors running a first set of GUIs for defining a Procedure; and
    a first set of computer processing components for automatically converting a defined Procedure into an Executable Procedure as an independent application,
    wherein said Procedure includes one or more Process Nodes, and each of said Process Nodes includes one or more Probes.

2. The GUI based network management system of claim 1, further comprising:
    a second set of computer processors running a second set of GUIs for executing said Executable Procedure in an electronic network; and
    a second set of computer processing components for performing said Executable Procedure and automatically displaying an error and warning message if a certain abnormal condition occurs.

3. The GUI based network management system of claim 1, further comprising:
    a third set of computer processors running a third set of GUIs for defining a Parser for extracting a set of key data information from a network command output; and
    a third set of computer processing components for executing said Parser to output the key data information.

4. The GUI based network management system of claim 1, further comprising:
    a fourth set of computer processors running a fourth set of GUIs for defining a Trigger for analyzing a set of key data information from a network command output; and
    a fourth set of computer processing components for executing said Trigger to provide a network solution.

5. The GUI based network management system of claim 1, wherein each of said Probes includes one or more of CLI Command Probes.

6. The GUI based network management system of claim 1, wherein each of said Probes includes one or more of Configuration Probes.

7. The GUI based network management system of claim 1, wherein each of said Probes includes one or more of Ping Probes.

8. The GUI based network management system of claim 1, wherein each of said Probes includes one or more of Traceroute Probes.

9. A GUI based network management system having computer processors, comprising:
    a first set of computer processors running a first set of GUIs for defining a Procedure;
    a first set of computer processing components for automatically converting a defined Procedure into an executable Procedure as an independent application; a second set of computer processors running a second set of GUIs for executing said executable Procedure in an electronic network; and
    a second set of computer processing components for performing said executable Procedure and automatically outputting a result,
        wherein said Procedure includes one or more Process Nodes, and each of said Process Nodes includes one or more Probes.

10. The GUI based network management system of claim 9, wherein each of said Probes includes a CLI Command Probe, a Configuration Probe, a Ping Probe or a Traceroute Probe, or a combination thereof.

11. The GUI based network management system of claim 9, further comprising:
    a third set of computer processors running a third set of GUIs for defining a Parser for extracting a set of key data information from a network output; and
    a third set of computer processing components for executing said Parser to output the key data information,
    wherein said Parser includes a Keyword Parser, a Table Parser, a Paragraph Parser and/or a Filter, or a combination thereof.

12. The GUI based network management system of claim 11, further comprising:
    a fourth set of computer processors running a fourth set of GUIs for defining a Trigger for analyzing said set of key data information output of said Parser; and
    a fourth set of computer processing components for executing said Trigger to automatically provide a network solution,
    wherein said Trigger includes a Threshold Trigger, a Compare Trigger, a Delta Trigger or an Advanced Trigger, or a combination thereof.

13. A method for automated network troubleshooting of a network of computer processors, comprising the steps of:
    providing a GUI based network management system running on said network of computer processors;
    defining a Procedure for network troubleshooting by using a first set of GUIs of said system;
    automatically converting a defined Procedure into an executable Procedure as an independent application by using a first set of computer processing components of said system;
    executing said executable Procedure in an electronic network via a second set of GUIs of said system; and
    performing said executable Procedure and automatically outputting a result via a second set of computer processing components of said system,
        wherein said Procedure includes one or more Process Nodes, and each of said Process Nodes includes one or more Probes.

14. The method of claim 13, further comprising the steps of:
- defining a Parser for extracting a set of key data information from a network output via a third set of GUIs of said system; and
- executing said Parser to output the key data information via a third set of computer processing components of said system.

15. The method of claim 13, further comprising the steps of:
- defining a Trigger for analyzing a set of key data information from a network output via a fourth set of GUIs of said system; and
- automatically executing said Trigger to provide a network solution via a fourth set of computer processing components of said system.

16. The method of claim 13, wherein each of said Probes includes a CLI Command Probe, a Configuration Probe, a Ping Probe or a Traceroute Probe, or a combination thereof.

17. The method of claim 14, wherein said Parser includes a Keyword Parser, a Table Parser, a Paragraph Parser and/or a Filter, or a combination thereof.

18. The method of claim 15, wherein said Trigger includes a Threshold Trigger, a Compare Trigger, a Delta Trigger or an Advanced Trigger, or a combination thereof.

* * * * *